United States Patent [19]

Kaneyama

[11] Patent Number: 5,757,511
[45] Date of Patent: May 26, 1998

[54] FACSIMILE STORAGE EXCHANGE APPARATUS

[75] Inventor: Yoshinobu Kaneyama, Yono, Japan

[73] Assignee: Kabushiki Kaisha Toshiba, Kawasaki, Japan

[21] Appl. No.: 731,579

[22] Filed: Oct. 16, 1996

Related U.S. Application Data

[63] Continuation of Ser. No. 230,553, Apr. 20, 1994, abandoned.

[30] Foreign Application Priority Data

Apr. 21, 1993 [JP] Japan .................................. 5-094009

[51] Int. Cl.$^6$ ..................................................... H04N 1/00
[52] U.S. Cl. ........................ 358/403; 358/405; 358/407; 358/440
[58] Field of Search .................................. 358/403, 405, 358/407, 434, 435, 436, 437, 438, 439, 440

[56] References Cited

U.S. PATENT DOCUMENTS

| 4,586,086 | 4/1986 | Ohzeki ..................... 358/407 |
| 4,994,926 | 2/1991 | Gordon et al. ............ 358/407 |

Primary Examiner—Thomas D. Lee
Attorney, Agent, or Firm—Finnegan, Henderson, Farabow, Garrett & Dunner, L.L.P.

[57] ABSTRACT

A facsimile storage exchange apparatus which is connected to a plurality of facsimile devices to temporarily store an original input from the facsimile device of at least one source and transmit and distribute the original to the facsimile devices of a plurality of specified destinations includes a storage memory for storing the original transmitted from the facsimile device of the source, transmission distribution section for transmitting and distributing the original stored in the storage memory to the facsimile devices of the destinations according to a command from the facsimile device of the source, transmission distribution result detecting section for detecting result information relating to the success or failure of the transmission distribution effected by the transmission distribution section, transmission distribution result transmitting section for transmitting the result information detected by the transmission distribution result detecting section to the facsimile device of the source, and received information transmitting section for creating received information based on the command of the facsimile device of the source and transmitting the received information to the facsimile device of the source.

60 Claims, 8 Drawing Sheets

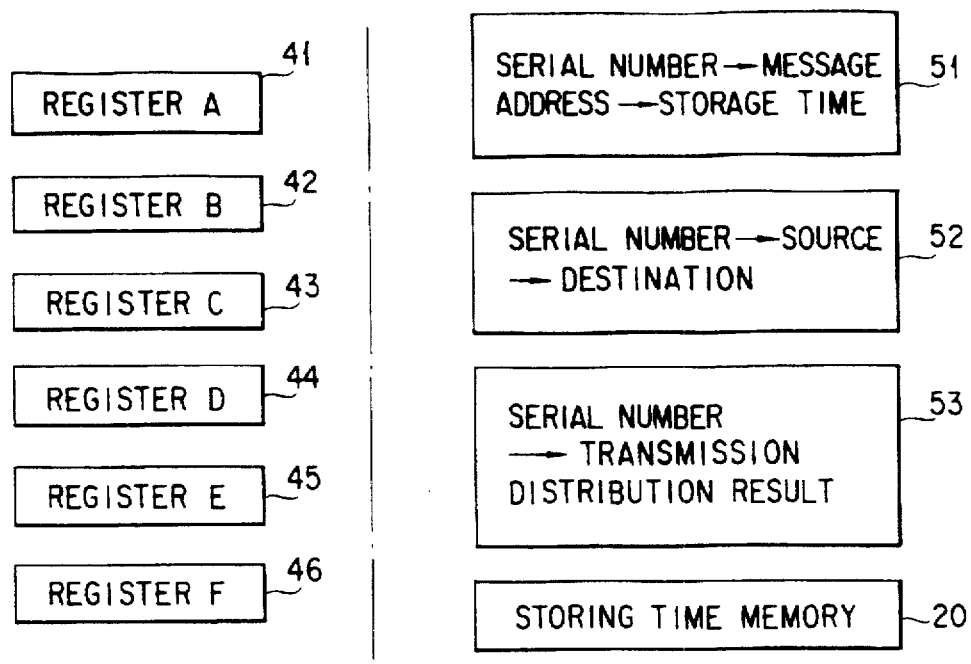
F I G. 4
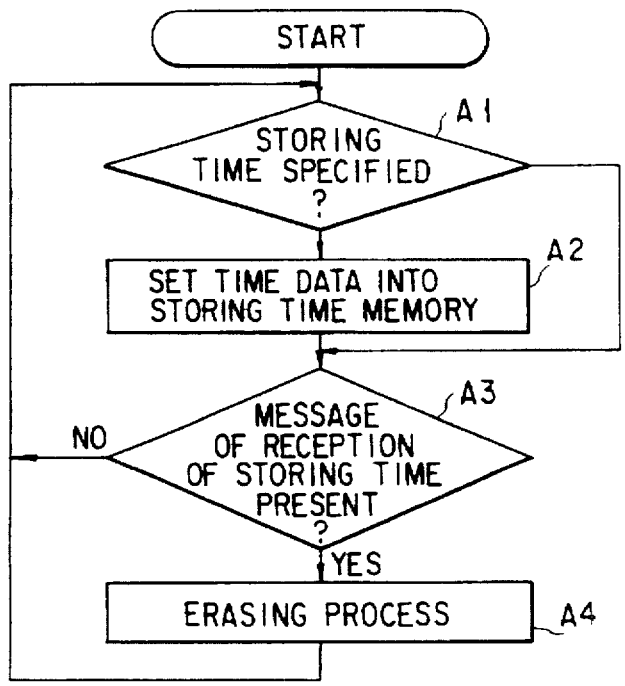
F I G. 5

"SVC""#""SOURCE""#""DESTINATION1""#""DESTINATION2"---"DESTINATIONn"

```
                    BROADCAST RECEIVING TABLE
                                    ┌802                      801
                         ORIGINAL                              
RECEPTION DATE           MANAGEMENT      NUMBER OF    RESULT INFORMING
AND TIME          TYPE   SERIAL NUMBER   ORIGINALS   DATE AND TIME

YY/MM/DD HH:MM    xxxx   xxxxxxx         xxx          YY/MM/DD HH:MM

SOURCE xxxxx     xxxxxxxxxx

DESTINATION xxxxx     xxxxx     xxxxx   — — — — — — — — —    xxxxx xxxxx     — — — — — — — — — — — — — — — — —     xxxxx

TRANSMISSION DISTRIBUTION RESULT IS
         INFORMED PLEASE CONFIRM
```

F I G.  8

```
          802 ╲      BROADCAST RESULT TABLE
                 ORIGINAL              TOTAL         NUMBER OF
RECEPTION        MANAGEMENT  NUMBER    NUMBER OF     DESTINATIONS OF
DATE             SERIAL      OF        TRANS-        TRANSMISSION
AND TIME   TYPE  NUMBER      ORIGINALS MISSIONS      FAILURE

YY/MM/DD HH:MM xxxx  xxxxxxx    xxx        xxxx           xxx

SOURCE xxxxx     xxxxxxxxx

DESTINATIONS OF TRANSMISSION FAILURE xxxxx     xxxxxxxxx              xxxxx      xxxxxxxxx xxxxx     xxxxxxxxx              xxxxx      xxxxxxxxx
```

F I G.  9

"SVC"""#""SOURCE"""#"ORIGINAL MANAGEMENT SERIAL NUMBER"
FIG. 10
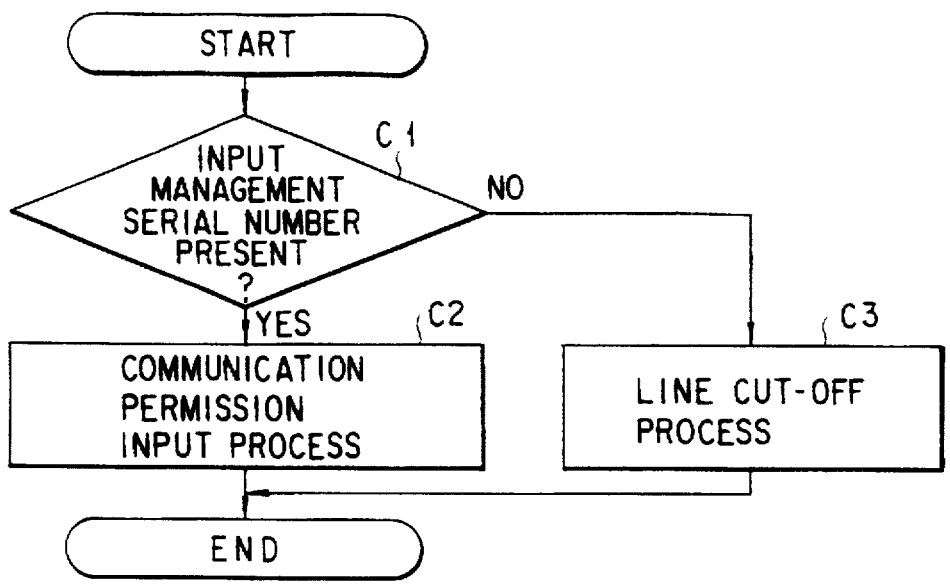
FIG. 11
FIG. 13
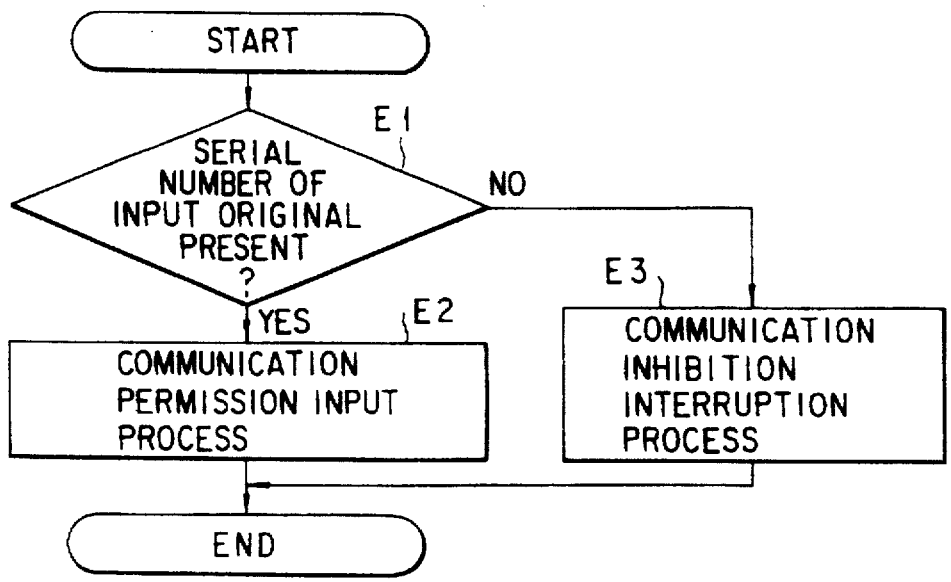

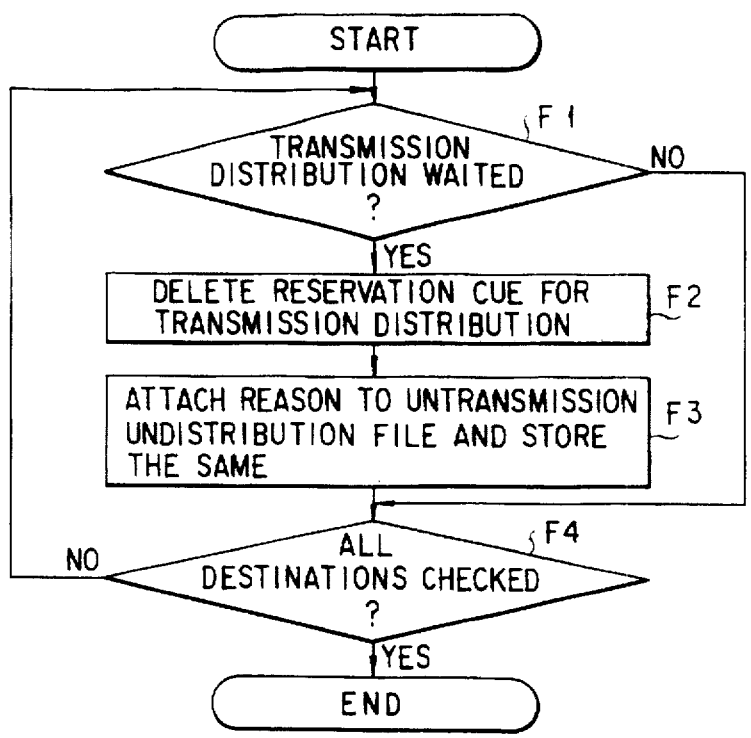

FIG. 14

| BROADCAST RESULT TABLE | | | | |
|---|---|---|---|---|
| RECEPTION DATE AND TIME | TYPE | ORIGINAL MANAGEMENT SERIAL NUMBER | NUMBER OF ORIGINALS | TOTAL NUMBER OF TRANS- MISSIONS | NUMBER OF DESTINATIONS OF TRANSMISSION FAILURE |
| YY/MM/DD HH:MM | xxxx | xxxxxxx | xxx | xxxx | xxx |

SOURCE xxxxx    xxxxxxxxxx

DESTINATIONS OF TRANSMISSION FAILURE    ,803 xxxxx    xxxxxxxxxx    (Y)xxxxx    xxxxxxxxxx xxxxx    xxxxxxxxxx    xxxxx    xxxxxxxxxx

FIG. 15

FACSIMILE STORAGE EXCHANGE APPARATUS

This is a continuation of application Ser. No. 08/230,553, filed Apr. 20, 1994, now abandoned.

BACKGROUND OF THE INVENTION

1. Field of the Invention

This invention relates to a facsimile storage exchange apparatus for inputting an original to and outputting the same from a facsimile device which is a terminal under management, and more particularly to the retransmission distribution of an original and the termination of transmission distribution.

2. Description of the Related Art

In a communication system using a facsimile storage exchange apparatus, the broadcast service for transmitting and distributing an original input from a facsimile device which is hereinafter simply referred to as a "terminal unit") of the terminal of a source to a plurality of destinations is effected.

When transmission distribution information such as destination and a message in the form image signal are transmitted from the terminal, the facsimile storage exchange apparatus transfers received information such as the message back to the terminal. The received information contains information such as the source, destination, original management number, the number of messages, the number of pages of each message, and reception date and time.

Further, the facsimile storage exchange apparatus transmits the message in the form of image signal to each destination contained in the transmission distribution information based on the transmission distribution information such as destinations transmitted from the terminal and transmits the success or failure of the transmission distribution as the transmission distribution result table to the source. The user of the terminal sees and checks the transmission distribution result table transmitted from the facsimile storage exchange apparatus, and if there are many destinations to which the message has not been transmitted, he takes some measures, for example, he would like to make a request for retransmission distribution to the facsimile storage exchange apparatus.

However, since it is not clear when the transmission distribution result information is transmitted from the facsimile storage exchange apparatus, the message or the like transmitted from the terminal is sometimes discarded (erased) on the facsimile storage exchange apparatus side when the transmission distribution result information is given to the user. In such a case, it is necessary to transmit data containing the message itself again and therefore the operation becomes troublesome. In addition, since specification of the retransmission distribution means transmission distribution to all of the destinations, useless transmission distribution occurs.

As another problem, there occurs a problem that there is no method for easily interrupting or terminating the transmission distribution operation of an original input from the terminal to the facsimile storage exchange apparatus. More specifically, for example, if erroneous destinations of the broadcast communication are specified, the broadcast communication of an original once input to the facsimile storage exchange apparatus cannot be terminated so that useless transmission distribution will be effected, thereby using the communication cost in vain and wasting output paper.

Further, since the transmission distribution operation by the unnecessary broadcast communication is effected from the facsimile storage exchange apparatus, the traffic of the communication system is increased by the unnecessary transmission distribution.

In order to solve the above problems, there is provided a method for terminating the broadcast communication of an original input from the terminal when the transmission distribution processing time for the broadcast communication has elapsed after a command for closing all of the input/output channels for the terminal under management was input to the facsimile storage exchange apparatus. However, with this method, the facsimile storage exchange apparatus cannot be used until the transmission distribution processing time has elapsed.

SUMMARY OF THE INVENTION

An object of the invention is to provide a facsimile storage exchange apparatus which permits the transmission distribution to be efficiently effected and permits the transmission distribution information to be given to the user without time delay after reception of the transmission distribution information.

Another object of the invention is to provide a facsimile storage exchange apparatus which can easily terminate the transmission distribution of an original once input according to a command of the user without giving any influence on the other processes.

A facsimile storage exchange apparatus according to a first aspect of the invention which is connected to a plurality of facsimile devices to temporarily store an original input from the facsimile device of at least one source and transmit and distribute the original to the facsimile devices of a plurality of specified destinations, comprises a storage memory for storing the original transmitted from the facsimile device of the source; transmission distribution means for transmitting and distributing the original stored in the storage memory to the facsimile devices of the destinations according to a command from the facsimile device of the source; transmission distribution result detecting means for detecting result information relating to the success or failure of the transmission distribution effected by the transmission distribution means; transmission distribution result transmitting means for transmitting the result information detected by the transmission distribution result detecting means to the facsimile device of the source; and received information transmitting means for creating received information based on the command of the facsimile device of the source and transmitting the received information to the facsimile device of the source. The facsimile storage exchange apparatus further comprises time calculating means for calculating predicted time at which the result information is transmitted by the transmission distribution result transmitting means when the original is transmitted from the facsimile device of the source and the received information contains time information of the predicted time calculated by the time calculating means. The time calculating means includes means for calculating the predicted time at which the result information is transmitted by the transmission distribution result transmitting means according to an amount of original supplied from the facsimile device of at least the source, the number of communication channels used, and the number of destinations of the original. The apparatus further comprises display means for displaying at least one of the result information, the receiving information and transmission distribution state of a transmitted original.

In addition, the facsimile storage exchange apparatus further comprises data managing means for adding an original management number to an original transmitted from the facsimile device of the source and data associated with the original and managing the same; and retransmission distribution controlling means for detecting an original management number corresponding to a command of retransmission distribution from the facsimile device of the source according to the command, causing the data managing means to read out an original corresponding to the original management number, and causing the transmission distribution means to retransmit and distribute the readout original to a destination associated with the command, and information associated with the retransmission distribution command contains information indicating either all of the initially intended destinations or destinations to which the transmission distribution has not been effected.

Further, in the above facsimile storage exchange apparatus, the data managing means includes means for effecting the control operation of erasing the original stored in the storage memory, and the above facsimile storage exchange apparatus further comprises a storing time memory in which storing time of the original stored in the storage memory is set; and determining means for determining time of the storing time memory; and the data managing means includes means for effecting the control operation of erasing the original stored in the storage memory based on the storing time data determined by the determining means.

According to the facsimile storage exchange apparatus according to the first aspect of this invention, a message corresponding to the original management number associated with a command of retransmission distribution is read out when the command of retransmission distribution is received and the message is transmitted to a destination or destinations to be retransmitted and distributed. Since the command of retransmission distribution contains information indicating either retransmission distribution to all of the destinations or retransmission distribution to only the destinations to which transmission distribution has not been effected, a command of efficient retransmission distribution can be made according to the success or failure of the transmission distribution.

Further, in the facsimile storage exchange apparatus according to the first aspect of this invention, the time calculating means calculates the predicted time of transmission distribution result information, and the received information transmitting means creates received information containing the predicted time and transmits the same to the facsimile device associated with the source. The user of the facsimile device of the source can get information of time at which the transmission distribution result information is transmitted and distributed by checking the received information. Therefore, by making an effort to receive the transmission distribution result at the predicted time, the user of the facsimile device of the source can immediately take a measure such as issuance of a command of retransmission distribution.

A facsimile storage exchange apparatus according to a second aspect of the invention further comprises determining means for determining whether an original specified by the received information is set in the transmission distribution waiting state or not according to a transmission distribution termination command transmitted from the facsimile device of the source; and transmission distribution termination means for terminating the transmission distribution of the original when the determining means determines that the original is set in the transmission distribution waiting state. In the facsimile storage exchange apparatus, the input means includes means for inputting a transmission distribution termination command of an original specified by the received information, and the facsimile storage exchange apparatus further comprises determining means for determining whether the original specified by the received information is set in the transmission distribution waiting state or not according to the transmission distribution termination command of the input means; and transmission distribution termination means for terminating the transmission distribution of the original when the determining means determines that the original is set in the transmission distribution waiting state.

In the facsimile storage exchange apparatus, the determining means includes means for determining whether an original specified by the received information is set in the transmission distribution waiting state or not for each destination of transmission distribution; and the transmission distribution termination means includes means for terminating the transmission distribution of the original for the respective destinations according to the result of determination by the determining means.

In the facsimile storage exchange apparatus, the received information transmitting means stores the original input from the terminal of the source and then returns identifying information specifying the original to the source. The receiving means receives the identifying information transmitted from the terminal of the source and a transmission distribution termination command of the original specified by the identifying information. When the transmission distribution termination command is received by the receiving means, the determining means determines whether the original specified by the identifying information has been transmitted and distributed or is set in the transmission distribution waiting state. When the determining means determines that the original is set in the transmission distribution waiting state, the transmission distribution termination means terminates the transmission distribution of the original. As a result, the user of the terminal of the source can easily terminate the transmission distribution of the original which has been once input to the facsimile storage exchange apparatus.

According to the facsimile storage exchange apparatus according to the second aspect of this invention, the transmission distribution of the original once input can be easily terminated according to the command of the user without giving any influence on the other processes.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a diagram showing a memory table used in the embodiment of this invention;

FIG. 5 is a flowchart for illustrating the process of erasing messages stored in a magnetic disk device 33;

FIG. 8 is a diagram showing an example of an output of broadcast receiving table;

FIG. 9 is a diagram showing an example of an output of broadcast result table;

FIG. 10 is a diagram showing an example of an input of retransmission distribution command;

FIG. 11 is a flowchart for illustrating the process of determining whether retransmission distribution is effected or not;

FIG. 13 is a flowchart for illustrating the process effected when a CPU receives a transmission distribution termination command from the terminal;

FIG. 14 is a flowchart for illustrating the transmission distribution termination process of the CPU; and FIG. 15 is a diagram showing an example of a broadcast result table transmitted from the facsimile storage exchange apparatus shown in FIG. 1 to the facsimile device of the source.

DETAILED DESCRIPTION OF THE PREFERRED EMBODIMENTS

There will now be described an embodiment of the invention with reference to the accompanying drawings.

Figure 1:
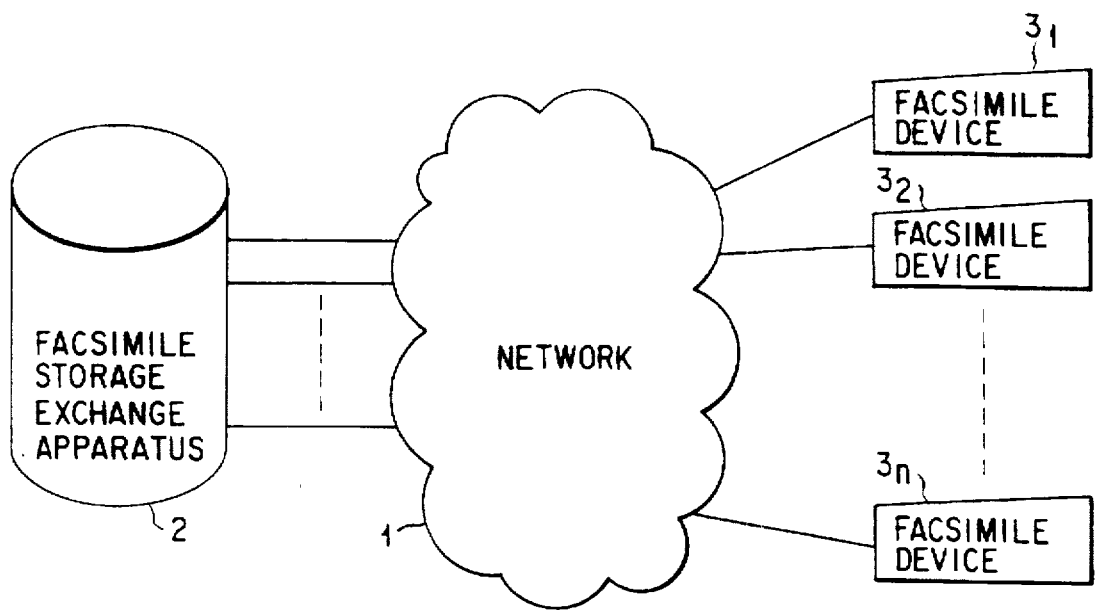
FIG. 1 is a block diagram of a communication system constructed by a facsimile storage exchange apparatus.

FIG. 1 is a block diagram of a communication system constructed by a facsimile storage exchange apparatus.

The communication system includes a network 1, facsimile storage exchange apparatus 2, and a plurality of terminals $3_1$ to $3_n$.

The network 1 connects the terminals $3_1$ to $3_n$ which are under management of the facsimile storage exchange apparatus 2 to the facsimile storage exchange apparatus 2.

The facsimile storage exchange apparatus 2 temporarily stores an original and then effects the process of transmitting and distributing the original to specified designations, for example.

The network 1 and the terminals $3_1$ to $3_n$ are connected together via dedicated lines and the network 1 and the facsimile storage exchange apparatus 2 are connected together via dedicated lines.

Figure 2:
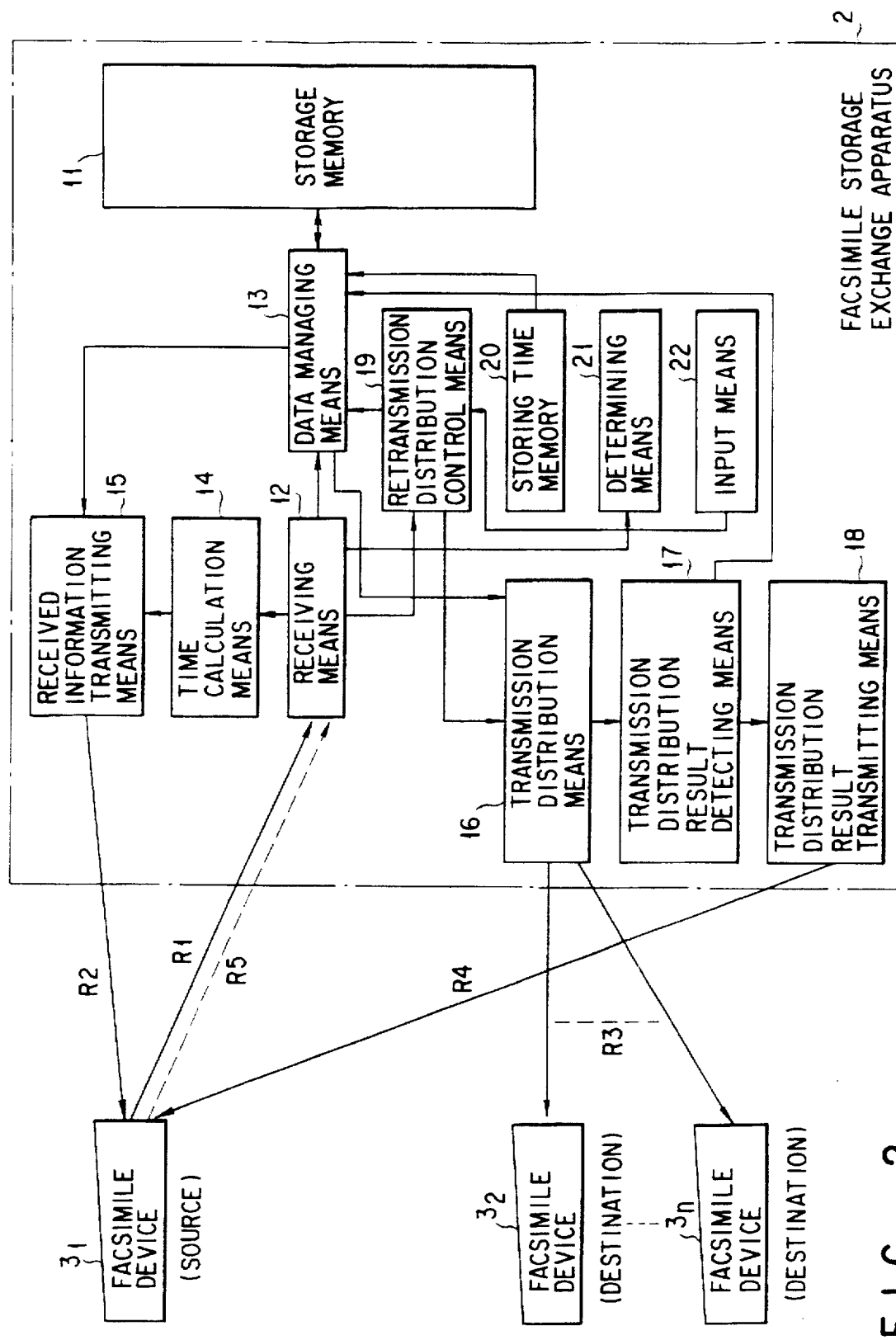
FIG. 2 is a schematic diagram showing the construction of a facsimile storage exchange apparatus according to a first embodiment of this invention.

FIG. 2 is a schematic diagram showing the construction of the facsimile storage exchange apparatus 2 according to a first embodiment of this invention. In FIG. 2, the network 1 is omitted.

In the following embodiment, the explanation for the actual operation is made on the assumption that the terminal $3_1$ is used as the source and the terminals $3_2$ to $3_n$ are specified as destinations.

The facsimile storage exchange apparatus 2 includes a storage memory 11, receiving means 12, data managing means 13, time calculating means 14, received information transmitting means 15, transmission distribution means 16, transmission distribution result detecting means 17, transmission distribution result transmitting means 18, transmission distribution control means 19, storing time memory 20, determining means 21, and input means 22.

The storage memory 11 stores messages or the like constructed by image signals.

The receiving means 12 receives messages or the like from the terminals $3_2$ to $3_n$.

As will be described later in detail, the data managing means 13 effects the processes of attaching an original management number (serial number) to the received message or the like and erasing the message stored in the storage memory 11, for example.

The time calculating means 14 calculates time at which the transmission distribution result information is transmitted to the source according to an amount of massage supplied from the source, the number of communication channels used, and the number of destinations of the message and outputs the calculated time data to the received information transmitting means 15.

The received information transmitting means 15 creates received information by using time calculated by the time calculating means 14 and information such as the source, destination, original management number, the number of messages, the number of pages for each message, and reception date and time supplied from the data managing means 13 and transmits the received information as an image signal to the source.

The transmission distribution means 16 transmits and distributes an image signal to preset destinations according to a command of the data managing means 13.

The transmission distribution result detecting means 17 detects the success or failure of the transmission distribution for each destination and data relating to the success or failure of the transmission distribution for each destination is transmitted together with source information to the transmission distribution result transmitting means 18 and data managing means 13.

The transmission distribution result transmitting means 18 lists data items relating to the success or failure of the transmission distribution for each destination and supplied from the transmission distribution result detecting means 17 and transmits them together with the original management numbers in the form of image signal to the source.

As will be described later in detail, the retransmission distribution control means 19 controls the transmission distribution means 16.

The storing time memory 20 stores storing time indicating a period of storing time for which the message stored in the storage memory 11 is kept stored after the message was stored into the storage memory.

The determining means 21 determines/changes the content of the storing time memory 20.

The input means 22 is constructed by a keyboard input device, for example, and issues a command of retransmission distribution for the retransmission distribution control means 19, a command of determination/change of the storing time for the determining means 21 and the like.

The operation of the apparatus of the invention with the above construction is explained.

When the receiving means 12 receives a message or the like from the terminal $3_1$ (arrow R1), it supplies data relating to the received message to the data managing means 13 and time calculating means 14.

The data managing means 13 attaches an original management number (serial number) to the message or the like received by the receiving means 12 for each communication and causes the message or the like to be stored into the storage memory 11 according to the original management number. Further, the data managing means 13 transmits data indicating the reception content and the original management number to the received information transmitting means 15.

The time calculating means 14 calculates time at which the transmission distribution result information is transmitted based on the amount of the message output from the receiving means 12 and supplied from the source, the number of communication channels used and the number of destinations of the message and outputs the calculated time data to the received information transmitting means 15.

The received information transmitting means 15 creates received information by use of time calculated by the time calculating means 14 and information such as the source, destination, original management number, the number of messages, the number of pages for each message, and reception date and time supplied from the data managing means 13 and transmits the received information as an image signal to the terminal $3_1$ which is used as the source (arrow R2).

The data managing means 13 reads out the message stored in the storage memory 11 and the destination data thereof at preset timings, outputs them to the transmission distribution means 16 and issues a command of transmission distribution.

The transmission distribution means 16 transmits and distributes the image signal to the terminals $3_2$ to $3_n$ of the destinations according to the command of the data managing means 13 (arrow R3).

At this time, the transmission distribution result detecting means 17 connected to the transmission distribution means 16 detects the success or failure of the transmission distribution for each destination. The criterion used for determining that the failure of the transmission distribution has occurred based on the number of times by which the transmission distribution is attempted while the transmission distribution cannot be successfully effected is set in each system. In this case, the criterion for determining the failure of the transmission distribution can be adequately changed by the user. An attempting number of the transmission distribution can be input by the input means 22 as a parameter. Data relating to the success or failure of the transmission distribution for each destination detected by the transmission distribution result detecting means 17 is output to the transmission distribution result transmitting means 18 and data managing means 13.

The transmission distribution result transmitting means 18 lists received data items of the success or failure of the transmission distribution for each destination and transmits the same as an image signal together with the original management number to the terminal $3_1$ of the source (arrow R4).

The user of the terminal $3_1$ of the source transmits a command of retransmission distribution to the facsimile storage exchange apparatus 2 (arrow R5), if necessary, after receiving transmission distribution information from the transmission distribution result transmitting means 18. In this case, the user of the terminal $3_1$ of the source can get information of time at which the transmission distribution result information is transmitted according to received information previously transmitted from the receiving information transmitting means 15. Information of the command of retransmission distribution by the user contains the original management number and information indicating either all of the initially intended destinations or destinations to which the transmission distribution has not been effected. The receiving means 12 receives information of the command of retransmission distribution and outputs the received command information to the retransmission distribution control means 19.

The retransmission distribution control means 19 detects the original management number associated with the command of the retransmission distribution and outputs the same to the data managing means 13. The data managing means 13 reads out a message corresponding to the original management number from the storage memory 11 and outputs the readout message and a command of transmission distribution to the transmission distribution means 16. The transmission distribution means 16 effects the retransmission distribution to the destination corresponding to the command. At this time, information of the command of transmission distribution contains information either all of the initially intended destinations or destinations to which the transmission distribution has not been effected, and the retransmission distribution control means 19 controls the transmission distribution means 16 based on the command information. Like the case of the first transmission distribution, in the case of retransmission distribution, received information is transmitted to the terminal $3_1$ of the source and then transmission distribution result information is transmitted to the terminal $3_1$ of the source.

In the above embodiment, a command of retransmission distribution is issued from the terminal $3_1$ of the source, but it is possible to input the command by use of the keyboard of the input means 22 and issue the command. In this case, command information of retransmission distribution input via the input means 22 is supplied to the retransmission distribution control means 19 and then the retransmission distribution is effected in the same manner as described above. The command information of the retransmission distribution input from the input means 22 may be supplied to the control means via the determining means 21.

The storing time memory 20 stores storing time indicating a period of storing time for which the message (individual messages or all of the messages) stored in the storage memory 11 is kept stored after the message was stored into the storage memory. When storing time data is supplied from any one of the terminals $3_1$ to $3_n$ via the input means 22 or receiving means 12, the determining means 21 receives the storing time data and changes the content of the storing time memory 20.

The data managing means 13 refers to the content of the storing time memory 20 and the starting time of storage of the message and effects the control operation of erasing the message stored for a period longer than the period of storing time.

Figure 3:
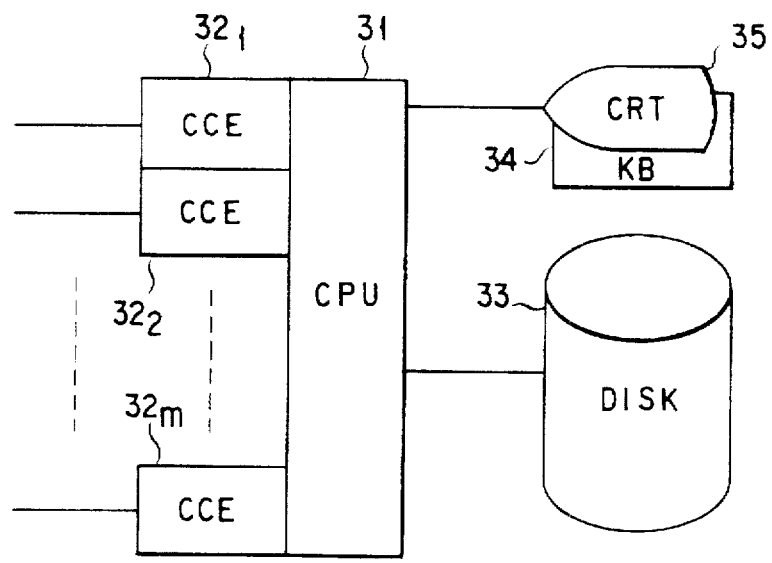
FIG. 3 is a block diagram of the facsimile storage exchange apparatus according to the first embodiment of this invention.

FIG. 3 is a block diagram of the facsimile storage exchange apparatus according to the first embodiment of this invention.

The facsimile storage exchange apparatus includes a CPU 31, communication control devices $32_1$ to $32_m$, magnetic disk device 33, keyboard input device 34, and CRT display device 35.

The CPU 31 effects the control operation for the entire portion of the facsimile storage exchange apparatus 2. The CPU 31 has a program for effecting a preset process as will be described later in detail, registers 41 to 46 shown in FIG. 4 are arranged in the main memory of the CPU 31 and perform the same functions as those of the respective means shown in FIG. 2 according to the above program. Further, the CPU 31 is connected to the magnetic disk device 33, keyboard input device 34, CRT display device 35 and a plurality of communication control devices $32_1$ to $32_m$.

The communication control devices $32_1$ to $32_m$ perform communication with respect to the facsimile terminals.

The magnetic disk device 33 includes the storage memory 11, storing time memory 20 and memory tables 51 to 53 shown in FIG. 4. The magnetic disk device 33 stores messages (input original), data and programs necessary for operating the CPU 31.

The keyboard input device 34 is used to input a command or the like to the facsimile storage exchange apparatus 2.

The CRT display device 35 displays data indicating the operation state of the facsimile storage exchange apparatus 2.

Now, the operation of erasing messages stored in the magnetic disk device 33 is explained with reference to FIG. 5. FIG. 5 is a flowchart for illustrating the procedure of erasing messages stored in the magnetic disk device 33. The CPU 31 effects the erasing management for the message stored in the magnetic disk device 33 according to the following procedure.

The CPU 31 checks whether or not storing time is specified and input from the keyboard input device 34 or terminals $3_1$ to $3_n$ (step A1). If the CPU 31 detects in the step A1 that the storing time is specified and input, the CPU 31 sets the input storing time into the storing time memory 20 in position corresponding to the message or as it is when the storing time is set for all of the messages (step A2).

If it is detected in the step A1 that no storing time is specified and input, the CPU 31 checks whether a message which is stored for a period of time longer than the storing time set in the storing time memory 20 is present or not (step A3). If it is detected in the step A3 that no message which is stored in the magnetic disk device 33 for a period of time longer than the storing time is present, the step A1 is effected, and if a message which is stored in the magnetic disk device 33 for a period of time longer than the storing time is present, the message is erased (step A4) and then the step A1 is effected.

Next, the operation effected when a message is transmitted from the terminal $3_1$ to the facsimile storage exchange apparatus 2 is explained with reference to FIG. 6.

A command of transmission distribution is input from the terminal $3_1$ prior to transmission of the message. The command of transmission distribution is effected by inputting preset items in an order as shown in FIG. 7, for example. In FIG. 7, "#" is a separation code and indicates the boundary of data. "SVC" is a service code of a preset number of digits and whether data is a command of transmission distribution or not is determined based on the code. Further, the service code "SVC" contains information specifying the destinations (only destinations of transmission failure or all of the destinations) of retransmission distribution when the retransmission distribution is effected. The "source" and "destination 1" to "destination n" are identification codes, for example, dial numbers of the source and respective destinations of transmission distribution. When the command of transmission distribution is issued, for example, the user inputs the service code by a preset number of digits of the command of transmission distribution indicated by "SVC" by use of ten keys, inputs the separation code "#", inputs the identification number (for example, dial number) of the source, inputs the separation code "#", and then inputs identification numbers (for example, dial numbers) of the destinations of a necessary number while separating them by the separation codes "#".

The CPU 31 detects the number of destinations for transmission distribution based on the command of transmission distribution, sets the number of destinations into the register A (step B1) and sets the communication time required for transmission of the message for transmission distribution into the register B (step B2). Further, the CPU 31 sets time at which the dial number of the destination is transmitted into the register C (step B3) and sets the number of communication channels used for transmission distribution of the message into the register D (step B4).

The CPU 31 divides data of the register A by data of the register D and checks whether data of the register A can be divided by data of the register D or not (step B5). In the step B5, if it is detected that data of the register A can be divided by data of the register D, the CPU 31 sets the quotient (A/D) into the register E (step B6) and if it is detected that data of the register A cannot be divided by data of the register D, the CPU 31 sets data ((A/D)+1) obtained by adding 1 to the quotient into the register E (step B7).

The CPU 31 adds data of the register B to data of the register C, multiplies data of the register E by the result of addition, adds 1 which is the communication number of transmission distribution of received information to the result of multiplication, and sets the result of addition into the register F (step B8).

The CPU 31 derives approximate time at which transmission distribution result information is transmitted by adding data of the register F to the present time (step B9).

The time at which transmission distribution result information is transmitted is transmitted as an image signal in a preset format to the terminal $3_1$ of the source together with information such as the source, destinations, original management number, the number of messages, the number of pages of each message, and reception date and time and the original management number.

An output example of received information transmitted in the above-described manner is shown in FIG. 8. As shown in FIG. 8, in the broadcast receiving table, an original management number 802 and transmission distribution predicted time 801 for transmission distribution result information are provided in addition to the reception date and time. The user of the source looks at the broadcast receiving table to get information on the predicted time at which the transmission distribution result information is transmitted and therefore he can obtain the result without delay.

In parallel with the above operation, The CPU 31 stores the message and destination information in connection with the original management number and gives a command to the communication control devices $32_1$ to $32_m$ to effect the transmission distribution processes. Further, the CPU 31 detects information on the success or failure of transmission distribution and stores the same in connection with the original management number into the magnetic disk device 33.

When the transmission distribution operation is effected according to a specified process, information on the success or failure of transmission distribution for all of the destinations is stored in connection with the original management number in the magnetic disk device 33. The CPU 31 transmits transmission distribution result information (broadcast result information) to the source of the message for the transmission distribution. An output example of the broadcast result table is shown in FIG. 9. In FIG. 9, information on the destinations of transmission failure (unsuccessful transmission) and the source is described in addition to the original management number 802, but it is also possible to describe destinations of successful transmission.

The transmission distribution result information may be received by the user who has gotten information on the transmission time immediately after completion of the transmission distribution. When the number of destinations of transmission failure is large, the user transmits a command of retransmission distribution in the form of PB (push button) signal to the facsimile storage exchange apparatus 2. More specifically, as shown in FIG. 10, the user inputs a service code "SVC" indicating the retransmission distribution, inputs "#" indicating the separation code, inputs the source by dial numbers, for example, inputs "#" indicating the separation code, and then inputs the original management number previously informed from the facsimile storage exchange apparatus 2.

In response to the command of retransmission distribution, the CPU 31 receives a command input in the form of PB signal via the communication control device 32 1 and effects the process shown in the flowchart of FIG. 11. FIG. 11 is a flowchart for illustrating the process of determining whether retransmission distribution is effected or not.

The CPU 31 analyzes the received command input of retransmission distribution and checks whether original management information is contained therein or not (step C1). In the step C1, if the same information as original management information stored in the magnetic disk device 33 is contained, the communication permission input process is effected to make the command input information valid (step C2). If it is detected in the step C1 that the original management information is not contained in the command input information or the original management information contained in the command input information is not stored in the magnetic disk device 33, the line cut-off process is effected (step C3).

Figure 12:
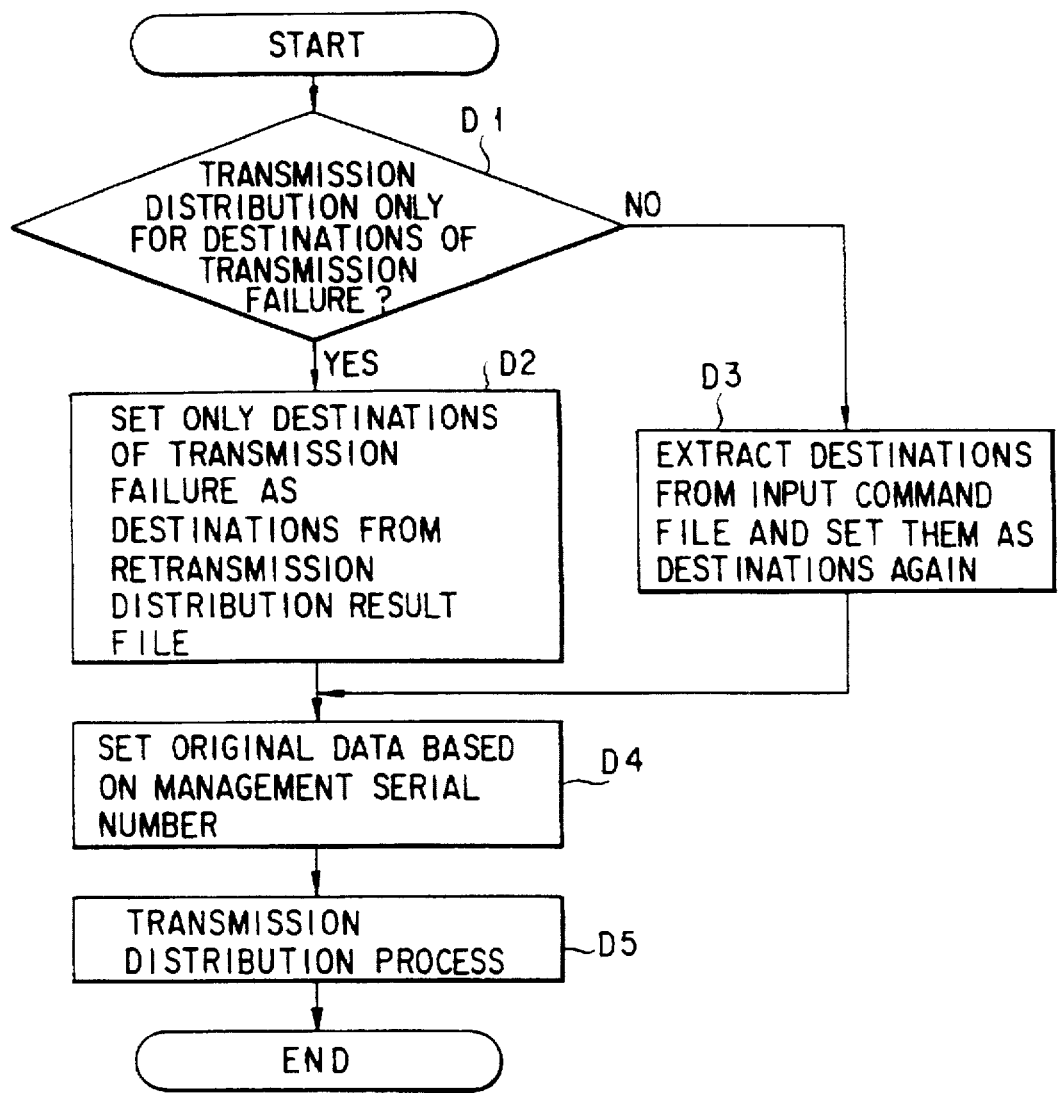
FIG. 12 is a flowchart for illustrating the process of effecting the retransmission distribution.

A process for effecting the retransmission distribution based on the command input information is explained with reference to the flowchart of FIG. 12.

The CPU 31 analyzes the service code "SVC" for specifying the retransmission distribution in the received information. The CPU 31 detects information on the destinations for retransmission distribution contained in the service code "SVC" (that is, information indicating that the transmission distribution is effected for all of the destinations again or the retransmission distribution is effected only for the destinations of transmission failure) (step D1).

If it is detected in the step D1 that a command for retransmission distribution only for the destinations of transmission failure is issued, the CPU 31 reads out transmission distribution result information corresponding to the original management number stored in the magnetic disk device 33 and outputs the same to those of the communication control devices $32_1$ to $32_m$ at the destinations corresponding only to the destinations of transmission failure so as to set the communication control devices $32_1$ to $32_m$ into an output enable state for outputting messages therefrom (step D2).

If it is detected in the step D1 that a command for retransmission distribution for all of the destinations is issued, the CPU 31 reads out all destination information corresponding to the original management number stored in the magnetic disk device 33 and outputs the same to those of the communication control devices $32_1$ to $32_m$ at the destinations corresponding to the destinations so as to set the communication control devices $32_1$ to $32_m$ into an output enable state for outputting messages therefrom (step D3).

The CPU 31 reads out a message corresponding to the original management number and outputs the same to the communication control devices $32_1$ to $32_m$ which are set in the message output enable state in the step D2 or D3 (step D4) and then effects the retransmission distribution process (step D5).

Figures 6, 7:
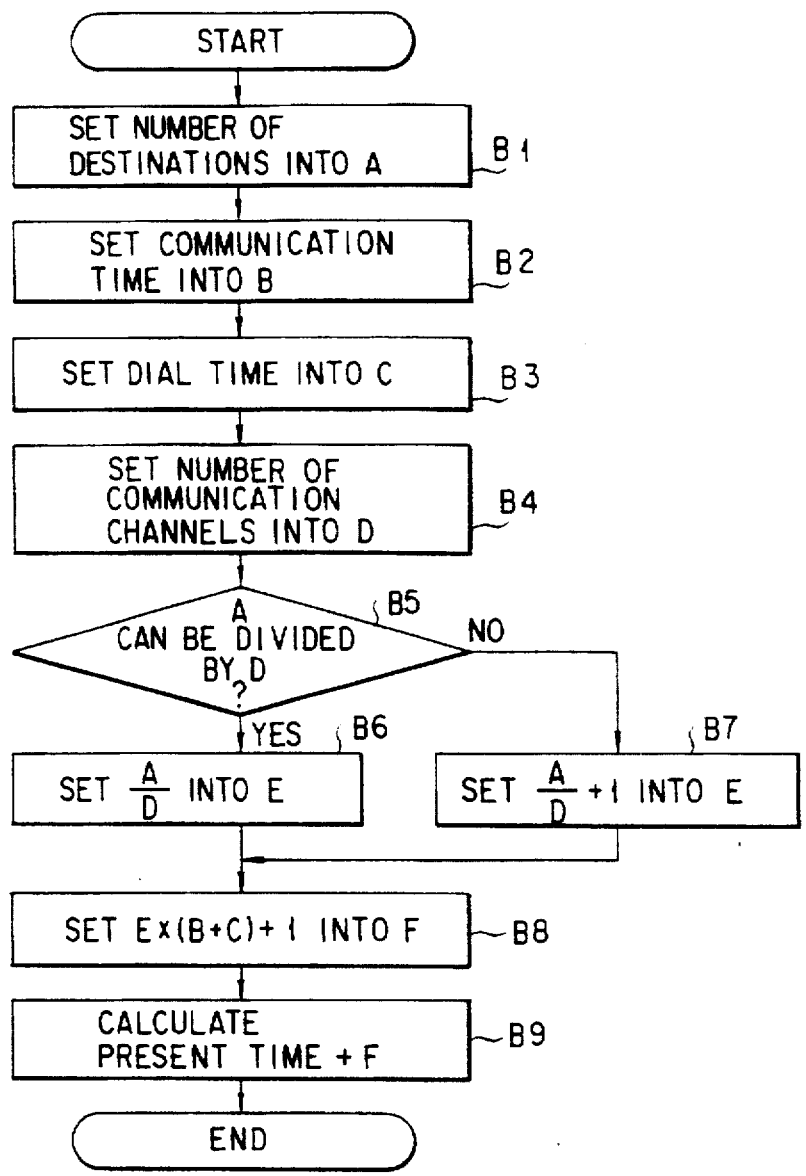
FIG. 6 is a flowchart for illustrating the operation effected when a message is transmitted from a terminal to a facsimile storage exchange apparatus 2.
FIG. 7 is a diagram showing an example of an input of transmission distribution command.

Also, when the retransmission distribution command information is supplied from the terminal $3_1$, the program shown by the flowchart of FIG. 6 is started in the same manner as in the case of transmission distribution, the transmission time of transmission distribution result information is calculated and the transmission distribution receiving table is informed to the terminal $3_1$.

In the first embodiment, a case wherein a command of retransmission distribution is issued from the terminal $3_1$ is explained, but it is possible for the operator of the facsimile storage exchange apparatus 2 to input the command by use of the keyboard input device 34 of the facsimile storage exchange apparatus 2. In this case, the transmission distribution result is read out and displayed on the CRT display device 35, for example, and if retransmission distribution is required, the type (only the destinations of transmission failure or all of the destinations) of retransmission distribution is input together with the original management number displayed. By this operation, the CPU 31 effects the transmission distribution process shown by the flowchart in FIG. 12.

Next, a facsimile storage exchange apparatus according to a second embodiment of the invention is explained. In the first embodiment, the retransmission distribution is explained, but in the second embodiment, termination of the transmission distribution is explained.

Since the construction of the apparatus of the second embodiment is the same as that of the first embodiment shown in FIGS. 1 to 3, the drawing and explanation thereof is omitted. Further, since the operation of broadcast communication is the same as that of the first embodiment, the explanation thereof is also omitted.

The user of the terminal $3_1$ who has made a request of broadcast communication service of an original (message) to the facsimile storage exchange apparatus 2 transmits a communication termination command to the facsimile storage exchange apparatus 2 when it is required to interrupt or terminate the broadcast communication of the original because of erroneous input of destinations, for example. More specifically, as shown in FIG. 10, the user inputs a service code "SVC" indicating termination of transmission distribution, inputs "#" which is a separation code, inputs the source by use of dial numbers, for example, inputs the separation code "#", and inputs an original management number for termination of transmission distribution. Since the original management number is described in a broadcast receiving table (shown in FIG. 8) returned from the facsimile storage exchange apparatus 2 when the original is input to the facsimile storage exchange apparatus 2, the user of the terminal $3_1$ can easily get information on the original management number.

The CPU 31 of the facsimile storage exchange apparatus 2 which has received a command of termination of transmission distribution from the terminal $3_1$ executes the process shown by the flowchart in FIG. 13. FIG. 13 is a flowchart for illustrating the process effected when the CPU 31 receives a transmission distribution termination command from the terminal $3_1$.

The CPU 31 analyzes received command input information of transmission distribution termination to check whether original management information is contained therein or not (step E1). In the step E1, if the same information as original management information stored in the magnetic disk device 33 is contained, the communication permission input process is effected to make the command input information valid (step E2). If it is detected in the step E1 that the original management information is not contained in the command input information or the original management information contained in the command input information is not stored in the magnetic disk device 33, the line cut-off process is effected (step E3).

FIG. 14 is a flowchart showing the operation of the CPU 31 according to transmission distribution termination command.

The CPU 31 determines whether the original for transmission distribution termination in the magnetic disk device 33 specified by the original management information is set in a transmission distribution waiting state, in-transmission distribution state, or transmission distribution completed state (step F1). If it is detected in the step F1 that the original for transmission distribution termination has already been or is now subjected to the transmission distribution process, the step F4 is effected, and in the transmission distribution waiting case, the step F2 is effected.

The CPU 31 checks a transmission distribution reservation cue in the magnetic disk device 33 for each destination of broadcast communication and erases the same (step F2). In the steps F1 and F2, the CPU 31 may effect a process for continuously effecting the transmission distribution of the original which is now subjected to the transmission distribution to destinations until it is completed or a process for forcedly terminating the transmission distribution.

The CPU 31 writes a reason code indicating that the transmission distribution is canceled into an untransmission undistribution file recorded in the magnetic disk device 33 for each destination (step F3) in order to create a broadcast result table (shown in FIG. 15) indicating the transmission distribution termination for each of the destinations to which the transmission distribution of the original is not effected by the transmission distribution termination command.

The CPU 31 checks whether or not the process of the steps F1 to F3 is effected for all of the destinations to which the transmission distribution of the original has been terminated, if the process is not yet effected for all of the destinations, the step F1 is effected, and if the process is effected for all of the destinations, the process is completed (step F4). When checking whether or not the process of the steps F1 to F3 is effected for all of the destinations in the step F4, the CPU 31 checks whether or not the transmission distribution reservation cue is present in the magnetic disk device 33 for each destination or whether or not information already subjected to the transmission distribution is present in another area of the magnetic disk device 33 so as to attain the perfect checking operation. In addition, a state of the transmission distribution can be observed on the CRT display device 35, the transmission distribution can be stopped if necessary. Thereafter user (or operator) can restarts the transmission distribution. Whether or not transmission of the original which is now subjected to the transmission distribution to the destination is terminated when the transmission distribution termination command is input to the facsimile storage exchange apparatus 2 can be determined in a more flexible manner if it can be previously determined by use of the input means 22 (keyboard input device 34).

After effecting the process shown in FIG. 14, the CPU 31 edits the broadcast result table as shown in FIG. 15 based on data in the untransmission undistribution file. In the broadcast result table, the fact that the original fails to be transmitted by the transmission distribution termination command from the terminal of the source is indicated by an unsuccessful transmission symbol 803. After editing the broadcast result table, the CPU 31 transmits the broadcast result table from the communication control device $32_1$ to the terminal $3_1$ of the source via the network 1, for example. As a result, the user of the terminal $3_1$ which has transmitted the transmission distribution termination command can receive the processing result for the transmission distribution termination command and can take adequate action.

According to the second embodiment, the transmission distribution of the original transmitted and distributed from the facsimile storage exchange apparatus 2 can be terminated for each destination by inputting a command for terminating the transmission distribution by the broadcast communication to the facsimile storage exchange apparatus 2 from the terminal $3_1$ of the source which has requested the broadcast communication process of the original. Therefore, according to this invention, when a broadcast communication request is made with respect to the facsimile storage exchange apparatus 2 and if the destination is erroneously specified, the transmission distribution can be immediately terminated so that the communication cost can be prevented from being unnecessarily increased and paper can be prevented from being wastefully used. As described above, according to this invention, since useless transmission distribution can be prevented, the number of factors which cause an increase in the traffic in the communication system can be reduced, thereby making it possible to effect the smooth communication.

In the second embodiment, a case wherein a transmission distribution termination command is input (transmitted) to the facsimile storage exchange apparatus 2 from the terminal of the source is explained, but it is possible to input the transmission distribution termination command from the input means 22 (keyboard input device 34) of the facsimile storage exchange apparatus 2. Also, in this case, the transmission distribution of the original can be terminated by causing the CPU 31 to effect the process of FIG. 14 in the same manner as in the above embodiment. Further, at this time, the operability of the apparatus can be enhanced by displaying the transmission distribution condition associated with the original to be subjected to the transmission distribution termination by use of the input means 22 (CRT display device 35).

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A facsimile storage exchange apparatus which is connected to a plurality of facsimile devices to temporarily store an original input transmitted from one of the facsimile devices, called a source device, to specified facsimile devices, called destination devices, comprising:

a storage memory for storing the original input transmitted from the source device;

transmission distribution means for transmitting the original stored in said storage memory to the destination devices according to a command from the source device;

transmission distribution result detecting means for detecting result information relating to the success or failure of the transmission distribution effected by said transmission distribution means;

transmission distribution result transmitting means for transmitting the result information detected by said transmission distribution result detecting means to the source device;

received information transmitting means for creating received information, which does not include the original, based on the command of the source device and transmitting the received information to the source device; and time calculating means for calculating predicted time at which the result information is transmitted by said transmission distribution result transmitting means when the original is transmitted from the source device and in which the received information contains time information of the predicted time calculated by said time calculating means.

2. An apparatus according to claim 1, further comprising:

data managing means for attaching an original management number to an original transmitted from the source device and data associated with the original and managing the data;

input means for inputting a command of retransmission distribution of the original; and retransmission distribution control means for detecting the original management number associated with the command based on the retransmission distribution command of said input means, causing said data managing means to read out an original corresponding to the original management number and causing said transmission distribution means to transmit and distribute the readout original to at least one of the destination devices associated with the command.

3. An apparatus according to claim 2, which further comprises:

a storing time memory into which storing time of the original stored in said storage memory is set; and determining means for determining time of said storing time memory; and in which said data managing means includes means for effecting the control operation of erasing the original stored in said storage memory based on the storing time data determined by said determining means.

4. An apparatus according to claim 2, further comprising display means for displaying at least one of said result information, said receiving information and transmission distribution state of a transmitted original.

5. An apparatus according to claim 4, wherein said input means includes means for inputting a command of a interruption of the transmission distribution and retransmission distribution.

6. An apparatus according to claim 2, wherein said input means includes means for inputting an attempting number of the transmission distribution which is criterion for determining the failure of the transmission distribution.

7. An apparatus according to claim 2, wherein information relating to the retransmission distribution command contains information indicating either all of the initially intended destination devices or destination devices to which the transmission distribution has not been effected.

8. An apparatus according to claim 2, wherein said data managing means includes means for effecting the control operation of erasing the original stored in said storage memory.

9. An apparatus according to claim 8, which further comprises:

a storing time memory into which storing time of the original stored in said storage memory is set; and determining means for determining time of said storing time memory; and in which said data managing means includes means for effecting the control operation of erasing the original stored in said storage memory based on the storing time data determined by said determining means.

10. An apparatus according to claim 1, further comprising display means for displaying at least one of said result information, said receiving information and transmission distribution state of a transmitted original.

11. An apparatus according to claim 1, further comprising data managing means for effecting the operation of erasing the original stored in said storage memory.

12. An apparatus according to claim 1, further comprising:

data managing means for adding an original management number to an original transmitted from the source device and data associated with the original and managing the same; and retransmission distribution controlling means for detecting an original management number corresponding to a command of retransmission distribution from the source device according to the command, causing said data managing means to read out an original corresponding to the original management number, and causing said transmission distribution means to retransmit and distribute the readout original to a destination device associated with the command.

13. An apparatus according to claim 12, wherein said data managing means includes means for effecting the control operation of erasing the original stored in said storage memory.

14. An apparatus according to claim 12, wherein information relating to the retransmission distribution command contains information indicating either all of the initially intended destination devices or destination devices to which the transmission distribution has not been effected.

15. An apparatus according to claim 14, wherein said data managing means includes means for effecting the control operation of erasing the original stored in said storage memory.

16. An apparatus according to claim 1, wherein said time calculating means includes means for calculating the predicted time at which the result information is transmitted by said transmission distribution result transmitting means according to an amount of original supplied from at least the source device, a number of communication channels used, and a number of devices of the original.

17. An apparatus according to claim 16, further comprising:

data managing means for attaching an original management number to an original transmitted from the source device and data associated with the original and managing the data;

input means for inputting a command of retransmission distribution of the original; and retransmission distribution control means for detecting the original management number associated with the command based on the retransmission distribution command of said input means, causing-said data managing means to read out an original corresponding to the original management number and causing said transmission distribution means to transmit and distribute the readout original to at least one of the destination devices associated with the command.

18. An apparatus according to claim 17, which further comprises:
a storing time memory into which storing time of the original stored in said storage memory is set; and
determining means for determining time of said storing time memory; and in which
said data managing means includes means for effecting the control operation of erasing the original stored in said storage memory based on the storing time data determined by said determining means.

19. An apparatus according to claim 17, further comprising display means for displaying at least one of said result information, said receiving information and transmission distribution state of a transmitted original.

20. An apparatus according to claim 19, wherein said input means includes means for inputting a command of a interruption of the transmission distribution and retransmission distribution.

21. An apparatus according to claim 17, wherein said input means includes means for inputting an attempting number of the transmission distribution which is criterion for determining the failure of the transmission distribution.

22. An apparatus according to claim 17, wherein information relating to the retransmission distribution command contains information indicating either all of the initially intended destination devices or destination devices to which the transmission distribution has not been effected.

23. An apparatus according to claim 17, wherein said data managing means includes means for effecting the control operation of erasing the original stored in said storage memory.

24. An apparatus according to claim 23, which further comprises:
a storing time memory into which storing time of the original stored in said storage memory is set; and
determining means for determining time of said storing time memory; and in which
said data managing means includes means for effecting the control operation of erasing the original stored in said storage memory based on the storing time data determined by said determining means.

25. An apparatus according to claim 16, further comprising display means for displaying at least one of said result information, said receiving information and transmission distribution state of a transmitted original.

26. An apparatus according to claim 16, further comprising data managing means for effecting the operation of erasing the original stored in said storage memory.

27. An apparatus according to claim 16, further comprising:
data managing means for adding an original management number to an original transmitted from the source device and data associated with the original and managing the same; and
retransmission distribution controlling means for detecting an original management number corresponding to a command of retransmission distribution from the source device according to the command, causing said data managing means to read out an original corresponding to the original management number, and causing said transmission distribution means to retransmit and distribute the readout original to a destination device associated with the command.

28. An apparatus according to claim 27, wherein said data managing means includes means for effecting the control operation of erasing the original stored in said storage memory.

29. An apparatus according to claim 27, wherein information relating to the retransmission distribution command contains information indicating either all of the initially intended destination devices or destination devices to which the transmission distribution has not been effected.

30. An apparatus according to claim 29, wherein said data managing means includes means for effecting the control operation of erasing the original stored in said storage memory.

31. An apparatus according to claim 1, further comprising:
input means for inputting identification information for specifying the original stored and a command of transmission distribution termination of the original specified by the identification information;
determination means for determining, independent of transmitting the received information to the source device, whether an original specified by the identification information is set in a transmission distribution waiting state or not according to the transmission distribution termination command from said input means; and
transmission distribution termination means for terminating the transmission distribution of the original when said determination means determines that the original input is set in the transmission distribution waiting state.

32. An apparatus according to claim 31, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

33. An apparatus according to claim 31, further comprising display means for displaying at least one of said result information, said receiving information and transmission distribution state of a transmitted original.

34. An apparatus according to claim 33, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

35. A facsimile storage exchange apparatus according to claim 1, further comprising:
determination means for determining whether an original specified by the received information is set in the transmission distribution waiting state or not according to a transmission distribution termination command transmitted from the source device; and transmission distribution termination means for terminating the transmission distribution of the original when said determination means determines that the original is set in the transmission distribution waiting state.

36. An apparatus according to claim 35, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

37. An apparatus according to claim 35, wherein said determination means includes means for determining whether an original specified by the received information is set in the transmission distribution waiting state or not for each destination device of transmission distribution; and said transmission distribution termination means includes means for terminating the transmission distribution of the original for the respective destination devices according to the result of determination by said determination means.

38. An apparatus according to claim 37, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

39. An apparatus according to claim 16, which further comprises:

a storing time memory in which storing time of the original stored in said storage memory is set; and determining means for determining time of said storing time memory; and in which said data managing means includes means for effecting the control operation of erasing the original stored in said storage memory based on the storing time data determined by said determining means.

40. An apparatus according to claim 39, further comprising:

input means for inputting identification information for specifying the original stored and a command of transmission distribution termination of the original specified by the identification information;

determination means for determining, independent of transmitting the received information to the source device, whether an original specified by the identification information is set in a transmission distribution waiting state or not according to the transmission distribution termination command from said input means; and transmission distribution termination means for terminating the transmission distribution of the original when said determination means determines that the original is set in the transmission distribution waiting state.

41. An apparatus according to claim 40, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

42. An apparatus according to claim 40, further comprising display means for displaying at least one of said result information, said receiving information and transmission distribution state of a transmitted original.

43. An apparatus according to claim 42, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

44. A facsimile storage exchange apparatus according to claim 39, further comprising:

determination means for determining whether an original specified by the received information is set in the transmission distribution waiting state or not according to a transmission distribution termination command transmitted from the source device; and transmission distribution termination means for terminating the transmission distribution of the original when said determination means determines that the original is set in the transmission distribution waiting state.

45. An apparatus according to claim 44, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

46. An apparatus according to claim 44, wherein said determination means includes means for determining whether an original specified by the received information is set in the transmission distribution waiting state or not for each destination device of transmission distribution; and said transmission distribution termination means includes means for terminating the transmission distribution of the original for the respective destination device according to the result of determination by said determination means.

47. An apparatus according to claim 46, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

48. An apparatus according to claims 1, in which said input means includes means for inputting a transmission distribution termination command of an original specified by the received information, and which further comprises:

determination means for determining whether the original specified by the received information is set in the transmission distribution waiting state or not according to the transmission distribution termination command of said input means; and transmission distribution termination means for terminating the transmission distribution of the original when said determination means determines that the original is set in the transmission distribution waiting state.

49. An apparatus according to claim 48, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

50. An apparatus according to claim 48, wherein said determination means includes means for determining whether an original specified by the received information is set in the transmission distribution waiting state or not for each destination device of transmission distribution; and said transmission distribution termination means includes means for terminating the transmission distribution of the original for the respective destination device according to the result of determination by said determination means.

51. An apparatus according to claim 50, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

52. A facsimile storage exchange apparatus which is connected to a plurality of facsimile devices to temporarily store an original input transmitted from one of the facsimile devices, called a source device, to specified facsimile devices called destination devices, comprising:

a storage memory for storing the original input transmitted from the source device;

transmission distribution means for transmitting the original stored in said storage memory to the destination devices according to a command from the source device;

transmission distribution result detecting means for detecting result information relating to the success or failure of the transmission distribution effected by said transmission distribution means;

transmission distribution result transmitting means for transmitting the result information detected by said transmission distribution result detecting means to the source device;

received information transmitting means for creating received information, which does not include the original, based on the command of the source device and transmitting the received information to the source device;

a storing time memory in which storing time of the original stored in said storage memory is set;

determining means for determining time of said storing time memory, and in which data managing means includes means for effecting the control operation of erasing the original stored in said storage memory based on the storing time data determined by said determining means;

input means for inputting identification information for specifying the original stored and a command of transmission distribution termination of the original specified by the identification information;

determination means for determining, independent of transmitting the received information to the source device, whether an original specified by the identification information is set in a transmission distribution waiting state or not according to the transmission distribution termination command from said input means;

transmission distribution termination means for terminating the transmission distribution of the original when said determination means determines that the original is set in the transmission distribution waiting state; and display means for displaying at least one of said result information, said receiving information and transmission distribution state of a transmitted original;

wherein said input means includes means for inputting a command of a interruption of the transmission distribution and retransmission distribution with recognizing said display means.

53. A facsimile storage exchange apparatus which is connected to a plurality of facsimile devices to temporarily store an original input image from the facsimile device of at least one source and transmit and distribute the original to destination devices, comprising:

a storage memory for storing the original transmitted from the source device;

received information transmitting means for creating received information distinct from the original input image based on a command of the source device and transmitting the received information to the source device;

determination means for determining, independent of transmitting the received information to the source device, whether an original specified by the received information is set in a transmission distribution waiting state or not according to a transmission distribution termination command transmitted from the source device, and transmission distribution termination means for terminating the transmission distribution of the original when said determination means determines that the original is set in the transmission distribution waiting state.

54. An apparatus according to claim 53, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

55. An apparatus according to claim 53, wherein said determination means includes means for determining whether an original specified by the received information is set in the transmission distribution waiting state or not for each destination of transmission distribution, and said transmission distribution termination means includes means for terminating the transmission distribution of the original for each destination according to the result of determination by said determination means.

56. An apparatus according to claim 55, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

57. A facsimile storage exchange apparatus which is connected to a plurality of facsimile devices to temporarily store an original input image from the facsimile device of at least one source and transmit and distribute the original to destination devices, comprising:

a storage memory for storing the original transmitted from the source device;

received information transmitting means for creating received information distinct from the original input image based on a command of the source device and transmitting the received information to the source device;

input means for inputting received information specifying the original stored and a command of transmission distribution termination of an original specified by the received information;

determination means for determining, independent of transmitting the received information to the source device, whether an original specified by the received information is set in a transmission distribution waiting state or not according to the transmission distribution termination command from said input means; and transmission distribution termination means for terminating the transmission distribution of the original when said determination means determines that the original is set in the transmission distribution waiting state.

58. An apparatus according to claim 57, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

59. An apparatus according to claim 57, wherein said determination means includes means for determining whether an original specified by the received information is set in the transmission distribution waiting state or not for each destination of transmission distribution, and said transmission distribution termination means includes means for terminating the transmission distribution of the original for each destination according to the result of determination by said determination mean.

60. An apparatus according to claim 59, wherein said transmission distribution termination means includes at least one of means for transmitting the entire portion of an original which is now transmitted in a case where the original is being transmitted when the transmission distribution termination command is input and means for forcedly terminating the transmission of the original which is now transmitted in a case where the original is being transmitted when the transmission distribution termination command is input.

* * * * *

UNITED STATES PATENT AND TRADEMARK OFFICE
CERTIFICATE OF CORRECTION

PATENT NO. : 5,757,511
DATED : May 26, 1998
INVENTOR(S) : Yoshinobu KANEYAMA

It is certified that error appears in the above-indentified patent and that said Letters Patent is hereby corrected as shown below:

In Claim 1, col. 15, line 2, "device:" should read --device;--.

In Claim 5, col. 15, lines 59-60, "a interruption" should read --an interruption--.

In Claim 8, col. 16, line 5, "man aging" should read --managing--.

In Claim 39, col. 19, line 35, "claim 16" should read --claim 1--.

In Claim 46, col. 20, line 48, "device" should read --devices--.

In Claim 48, col. 20, line 61, "claims" should read --claim--.

In Claim 50, col. 21, line 24, "device" should read --devices--.

UNITED STATES PATENT AND TRADEMARK OFFICE
CERTIFICATE OF CORRECTION

PATENT NO. : 5,757,511
DATED : May 26, 1998
INVENTOR(S) : Yoshinobu KANEYAMA

It is certified that error appears in the above-identified patent and that said Letters Patent is hereby corrected as shown below:

In Claim 52, col. 21, line 41, after "devices" (first occurrence), insert --,--.

In Claim 52, col. 22, line 22, "a interruption" should read --an interruption--.

In Claim 59, col. 24, line 22, "mean" should read --means--.

Signed and Sealed this

Twenty-fourth Day of August, 1999

Attest:

Attesting Officer

Q. TODD DICKINSON

Acting Commissioner of Patents and Trademarks